United States Patent
Chang

(10) Patent No.: US 9,569,126 B2
(45) Date of Patent: Feb. 14, 2017

(54) DATA STORAGE DEVICE AND FLASH MEMORY CONTROL METHOD

(71) Applicant: Silicon Motion, Inc., Jhubei (TW)

(72) Inventor: Yi-Kang Chang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 41 days.

(21) Appl. No.: 14/802,515

(22) Filed: Jul. 17, 2015

(65) Prior Publication Data

US 2016/0216907 A1    Jul. 28, 2016

(30) Foreign Application Priority Data

Jan. 22, 2015 (TW) .............................. 104102053 A

(51) Int. Cl.
  *G06F 12/00* (2006.01)
  *G06F 3/06* (2006.01)

(52) U.S. Cl.
  CPC ............ *G06F 3/0619* (2013.01); *G06F 3/064* (2013.01); *G06F 3/0656* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 2010/0082882 A1* | 4/2010 | Im | G06F 3/0611 711/103 |
| 2010/0299558 A1 | 11/2010 | Tojo et al. | |
| 2011/0072193 A1* | 3/2011 | Yeh | G06F 3/0611 711/103 |
| 2013/0191578 A1 | 7/2013 | Goss et al. | |

FOREIGN PATENT DOCUMENTS

| | | |
|---|---|---|
| EP | 1967953 A2 | 9/2008 |
| WO | 2009107212 A1 | 9/2009 |
| WO | 2011148223 A1 | 12/2011 |
| WO | 2012050934 A2 | 4/2012 |
| WO | 2013054374 A1 | 4/2013 |
| WO | 2014142427 A1 | 9/2014 |

OTHER PUBLICATIONS

Notice of Allowance of corresponding TW application, published on Apr. 29, 2016.

* cited by examiner

*Primary Examiner* — Daniel Tsui

(74) *Attorney, Agent, or Firm* — Wang Law Firm, Inc.

(57) ABSTRACT

A flash memory control technology with power recovery capability, by which command sequence information is generated for write data that is requested to be written into a flash memory. A random access memory is allocated for temporary storage of the write data and the command sequence information. The write data is uploaded from the random access memory onto a run-time write block between physical blocks of the flash memory with the command sequence information corresponding thereto. During a power recovery process of a data storage device that is equipped with the flash memory, the run-time write block is checked and, according to the command sequence information that has been uploaded onto the run-time write block, the write data in the run-time write block and later in a command sequence than lost data is abandoned.

10 Claims, 5 Drawing Sheets

DATA STORAGE DEVICE AND FLASH MEMORY CONTROL METHOD

CROSS REFERENCE TO RELATED APPLICATIONS

This Application claims priority of Taiwan Patent Application No. 104102053, filed on Jan. 22, 2015, the entirety of which is incorporated by reference herein.

BACKGROUND OF THE INVENTION

Field of the Invention

The present invention relates to data storage devices with flash memory and flash memory control methods.

Description of the Related Art

Flash memory, a data storage medium, is common in today's data storage devices. A NAND flash is one common type of flash memory.

For example, flash memory is typically used in memory cards, USB flash devices, solid-state drives, and so on. In another application with multi-chip package technology, a NAND flash chip and a controller chip are combined in one package as an embedded multi-media card (e.g. eMMC).

The storage space of a flash memory generally provides a plurality of physical blocks, and each physical block includes a plurality of physical pages. To release storage space for reuse, an erase operation has to be performed on a block-by-block basis, to release space one block at a time. When updating data, the new data is written into a spare space rather than being overwritten onto old data, and the old data has to be invalidated. Thus, the storage space management of flash memory is more complex than other storage mediums. A controller designed especially for flash memory is therefore called for.

BRIEF SUMMARY OF THE INVENTION

A flash memory control technology with power recovery capability is shown.

A data storage device in accordance with an exemplary embodiment of the disclosure comprises a flash memory and a control unit. The flash memory provides a storage space that is divided into a plurality of physical blocks with each physical block comprising a plurality of physical pages. The control unit comprises a microcontroller and a random access memory. The microcontroller is configured to generate command sequence information for write data and further allocate the random access memory for temporary storage of the write data and the command sequence information. The microcontroller is further configured to upload the write data from the random access memory onto a run-time write block between the physical blocks of the flash memory with the command sequence information. The microcontroller is further configured to check the run-time write block during a power recovery process of the data storage device. Based on the command sequence information that has been uploaded onto the run-time write block, the write data in the run-time write block and later in a command sequence than lost data is abandoned. In this manner, after the power recovery process for the power failure events, the valid data in the run-time write block complies with the command sequence. When considering the operational efficiency and therefore not following the command sequence to upload the write data onto the run-time write block, the valid data in the run-time write block still complies with the command sequence after the power recovery process.

A flash memory control method in accordance with an exemplary embodiment of the disclosure comprises the following steps: generating command sequence information for write data that is requested to be written into a flash memory, and allocating a random access memory for temporary storage of the write data and the command sequence information; uploading the write data onto a run-time write block between physical blocks of the flash memory with the command sequence information corresponding thereto, each physical block comprising a plurality of physical pages; and checking the run-time write block during a power recovery process of a data storage device that is equipped with the flash memory, to abandon the write data in the run-time write block and later than lost data in a command sequence in accordance with the command sequence information that has been uploaded onto the run-time write block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
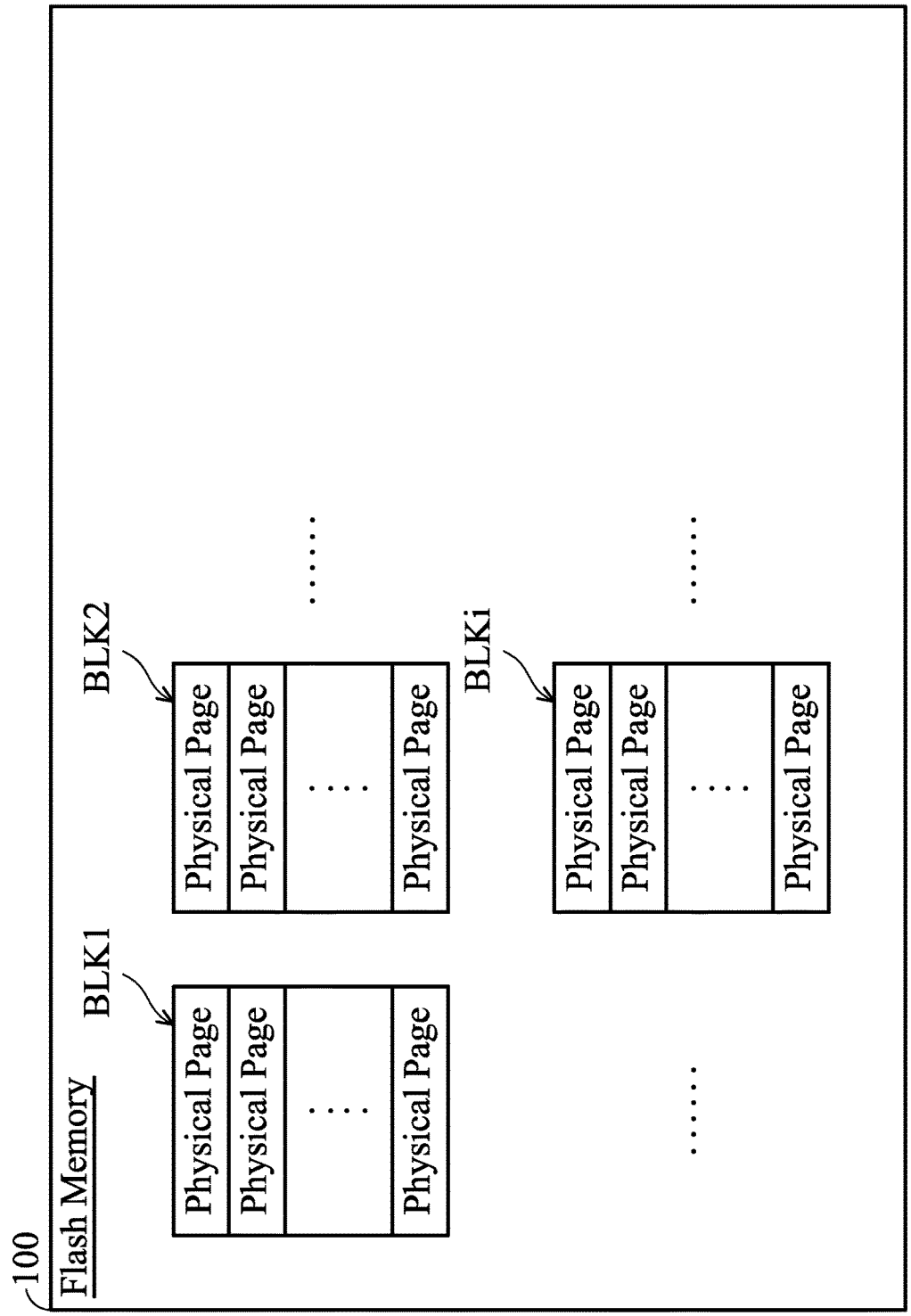
FIG. 1 depicts a storage space provided by a flash memory 100.

FIG. 1 depicts a storage space provided by a flash memory 100, which is divided into a plurality of physical blocks BLK1, BLK2 . . . BLKi . . . Each physical block comprises a plurality of physical pages.

Figure 2:
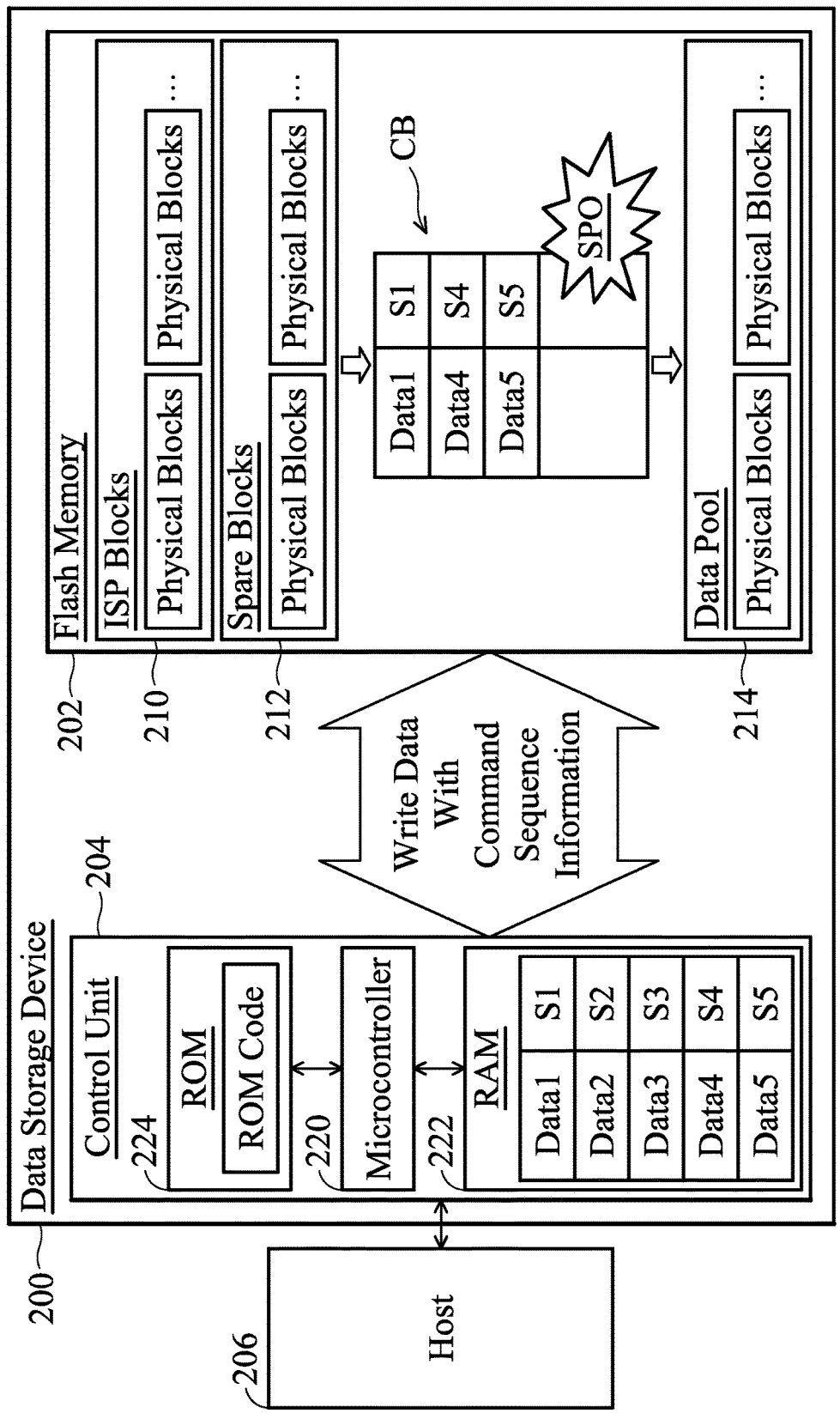
FIG. 2 depicts a data storage device 200 in accordance with an exemplary embodiment of the disclosure.

FIG. 2 depicts a data storage device 200 in accordance with an exemplary embodiment of the disclosure, which comprises a flash memory 202 and a control unit 204. The control unit 204 is coupled between a host 206 and the flash memory 202 to operate the flash memory 202 in accordance with the commands issued from the host 206.

The storage space of the flash memory 202 is allocated to provide ISP (in-system-program) blocks 210, spare blocks 212, a run-time write block CB and a data pool 214. The ISP blocks 210 store in-system programs (ISPs). The run-time write block CB is allocated from the spare blocks 212 for reception of write data issued from the host 206. When the collection of write data is finished, the run-time write block CB is pushed into the data pool 214 and another physical block between the spare blocks 212 is allocated to play the role of the reception block of the write data.

The control unit 204 includes a microcontroller 220, a random access memory 222 (e.g. an SRAM) and a read-only memory 224. The read-only memory 224 stores read-only codes (e.g. ROM code). The microcontroller 220 operates by executing the ROM code stored in the read-only memory 224 or/and by executing the ISPs stored in the ISP blocks 210 of the flash memory 202.

The microcontroller 220 is configured to generate command sequence information for write data, and further allocates the random access memory 222 for temporary storage of the write data and the command sequence information. The microcontroller 220 is further configured to upload the write data from the random access memory 222 onto the run-time write block CB of the flash memory 202 with the command sequence information. The microcontroller 220 is further configured to check the run-time write block CB during a power recovery process of the data storage device 200. Based on the command sequence information that has been uploaded onto the run-time write block CB, the write data in the run-time write block and later in a command sequence than lost data is abandoned.

In this paragraph, the exemplary embodiment of FIG. 2 is discussed in detail. The host 206 issues write commands that contain write data Data1, Data2, Data3, Data4 and Data5. Based on the order of the write commands, the microcontroller 220 generates command sequence information S1, S2, S3, S4 and S5 for the write data Data1, Data2, Data3, Data4 and Data5, to show that the write data Data1 is requested earlier than the write data Data2, the write data Data2 is requested earlier than the write data Data3, the write data Data3 is requested earlier than the write data Data4, and the write data Data4 is requested earlier than the write data Data5. The microcontroller 220 is further configured to upload the write data Data1 . . . Data5 from the random access memory 222 onto the run-time write block CB of the flash memory 202 with the command sequence information S1 . . . S5. Note that the run-time write block CB is updated for the best performance of the flash memory 202. It means that the data uploaded onto the run-time write block CB may be inconsistent with the order of the write commands. In FIG. 2, considering the operational efficiency of the flash memory 202, the write data Data4 and Data5 and the command sequence information S4 and S5 corresponding thereto are uploaded onto the run-time write block CB earlier than the write data Data2 and Data3 and the command sequence information S2 and S3. However, in FIG. 2, a sudden power-off event SPO occurs before uploading the write data Data2 and Data3 and the command sequence information S2 and S3 onto the run-time write block CB. During the power recovery process (e.g., a sudden power off recovery process, a.k.a. SPOR process) of the data storage device 200, the microcontroller 220 is configured to check the run-time write block CB. Based on the command sequence information S1, S4 and S5 contained in the run-time write block CB, the microcontroller 220 abandons the write data Data4 and Data5 in the run-time write block CB because the write data Data4 and Data5 is later than the lost data Data2 and Data3 in the command sequence (e.g. the host 206 requests the write data Data4 and Data5 later than the lost data Data2 and Data3). In an exemplary embodiment, the physical pages storing the write data Data4 and Data5 and the command sequence information S4 and S5 in the run-time write block CB are regarded as containing invalid data. In this manner, the run-time write block CB with the remaining valid data Data1 is consistent with the command sequence. The microcontroller 220 may be further configured to build logical-to-physical address mapping information for the run-time write block CB. In summary, the run-time write block CB after the power recovery process is consistent with the command sequence even though the write data was not uploaded onto the run-time write block CB according to the command sequence.

Figure 3:
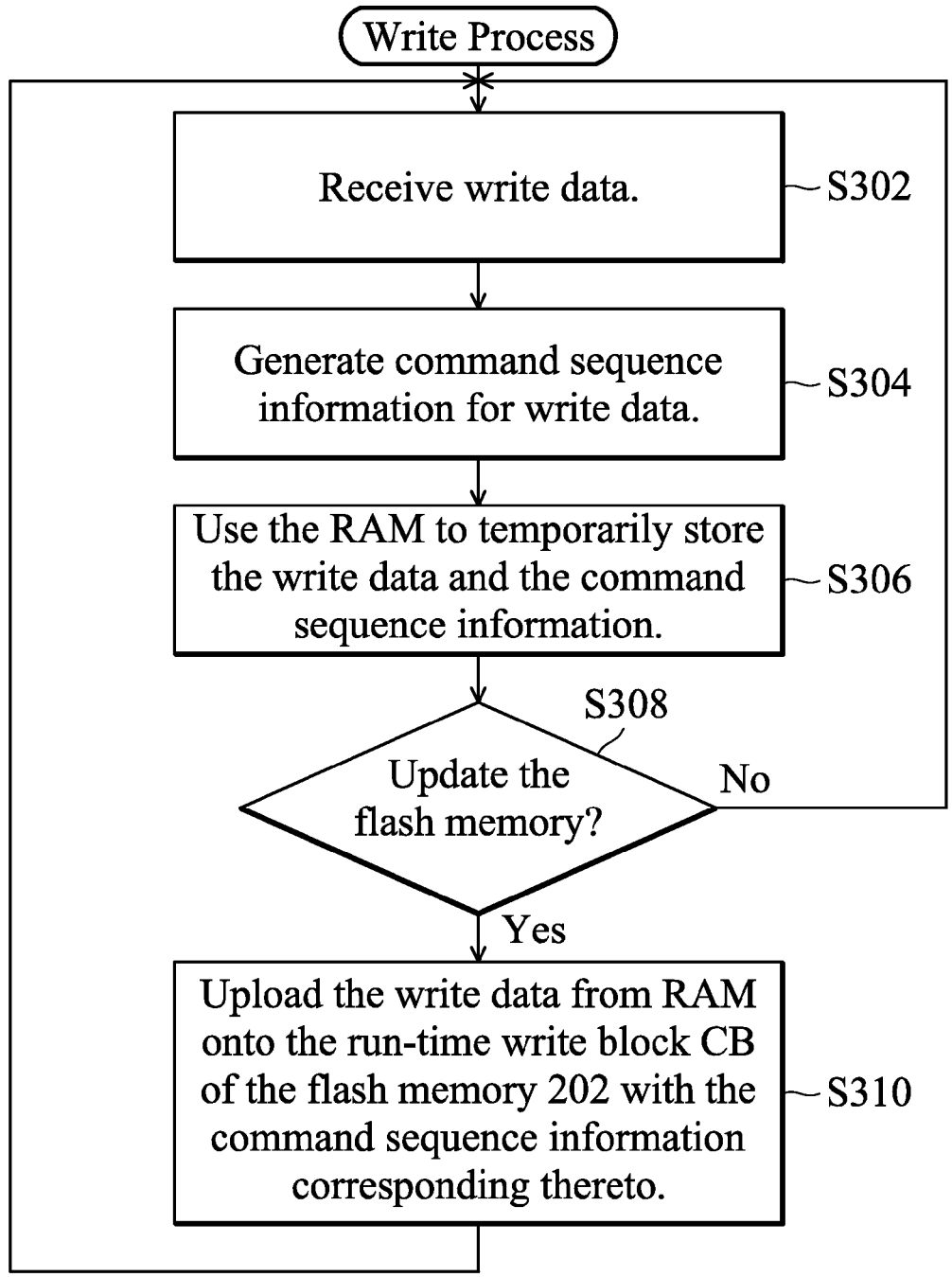
FIG. 3 is a flowchart depicting a write process for a flash memory 202 in accordance with an exemplary embodiment of the disclosure.

FIG. 3 is a flowchart depicting a write process of a flash memory 202 in accordance with an exemplary embodiment of the disclosure, which is discussed with respect to FIG. 2. In step S302, write data issued from the host 206 is received by the data storage device 200. The first received write data is Data1. In step S304, the command sequence information for the write data that is requested to be written into the flash memory 202 is generated. Thus, command sequence information S1 is generated for the write data Data1. In step S306, the write data and the command sequence information are stored into the random access memory 222 for temporary storage. Thus, the write data Data1 and the command sequence information S1 are stored into the random access memory 222 for temporary storage. In step S308, it is determined whether to perform the update of the flash memory 202. In the exemplary embodiment shown in FIG. 2, the update of the flash memory 202 is not performed and steps S302 to S308 are repeated until the write data Data5 and the command sequence information S5 are stored into the random access memory 222. When it is determined in step S308 that it is time to update the flash memory 202, step S310 is performed to upload the write data Data1 . . . Data5 and the command sequence information S1 . . . S5 from the random access memory 222 onto the run-time write block CB of the flash memory 202. After the update of the flash memory 202 (step S310) is finished, the flow returns to step 302 for new write data.

Referring to FIG. 2, considering the operational efficiency of the flash memory 202, the write data Data4 and Data5 and the command sequence information S4 and S5 are uploaded onto the run-time write block CB earlier than the write data Data2 and Data3 and the command sequence information S2 and S3. A sudden power-off event SPO unexpectedly occurs when the write data Data4 and Data5 and the command sequence information S4 and S5 have been uploaded onto the run-time write block CB but the write data Data2 and Data3 and the command sequence information S2 and S3 have not been uploaded onto the run-time write block CB. The sudden power-off event SPO interrupts step S310. In the power recovery process, a procedure is required to cope with the interrupted step S310.

Figure 4:
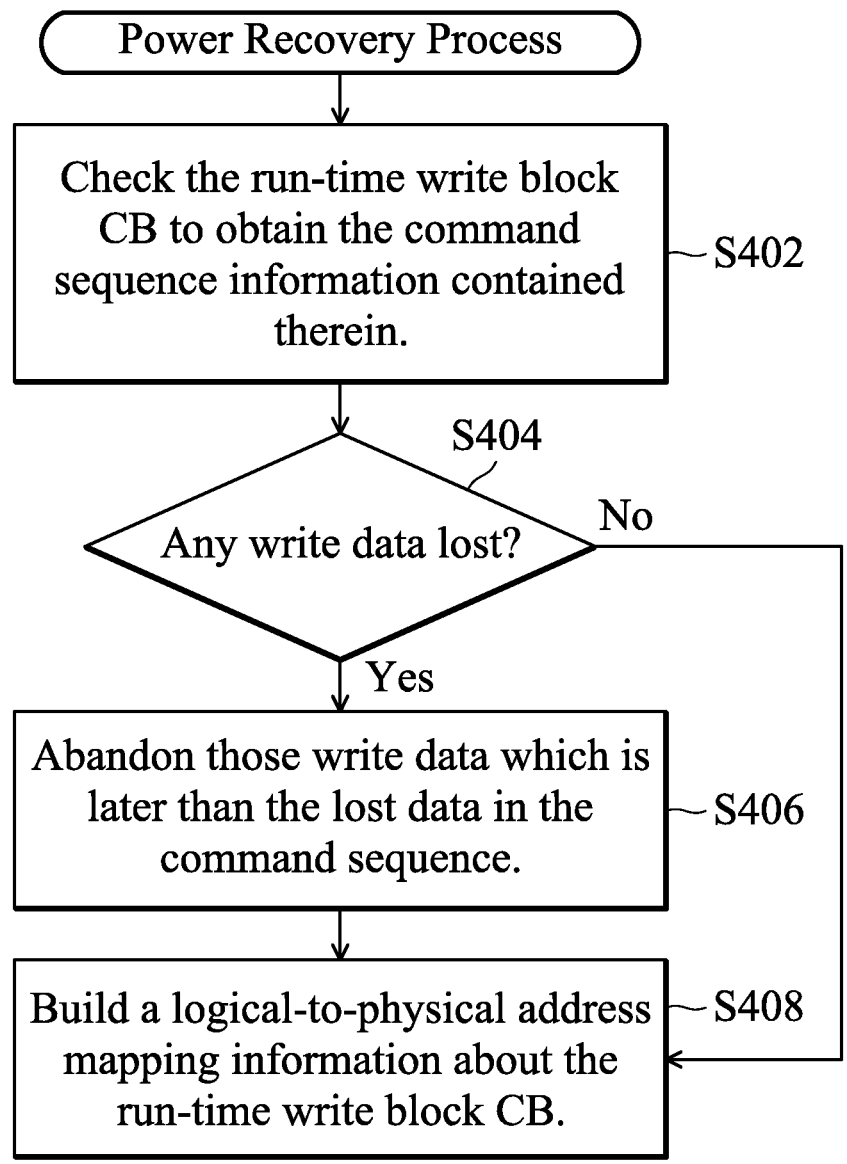
FIG. 4 is a flowchart depicting a power recovery process in accordance with an exemplary embodiment of the disclosure.

FIG. 4 is a flowchart depicting a power recovery process in accordance with an exemplary embodiment of the disclosure, which is discussed with respect to FIG. 2. In step S402, the run-time write block CB is checked and the command sequence information S1, S4 and S5 stored therein is obtained. In step S404, it is determined, based on the command sequence information S1, S4 and S5, whether any write data has been lost in the update of the flash memory 202 (e.g., because of the interrupted step S310). The command sequence information S1, S4 and S5 obtained from the run-time write block CB implies the loss of the write data Data2 and Data3, and step S406 is performed to abandon the write data Data4 and Data5 later than the lost data Data2 and Data3 in the command sequence. After the write data Data4 and Data5 in the run-time write block CB is abandoned, step S408 is performed to build the logicalto-physical mapping information about the run-time write block CB. In the exemplary embodiment of FIG. 2, the logical-to-physical address mapping information between the write data Data1 and the run-time write block CB is established while logical-to-physical address mapping between the write data Data4 and Data5 and the run-time write block CB is ignored. Conversely, when it is determined in step S404 that none of the write data is lost, step S406 is bypassed and step S408 is performed to build the logical-to-physical address mapping information about the run-time write block CB.

In some exemplary embodiments, each physical page for write data is further allocated for storage of the command sequence information. Referring to the exemplary embodiment of FIG. 2, the write data Data1 and the command sequence information S1 are stored in the same physical page, the write data Data4 and the command sequence information S4 are stored in the same physical page, and the write data Data5 and the command sequence information S5 are stored in the same physical page.

In some exemplary embodiments, the command sequence information is stored in a plurality of digital bits. During the power recovery process of the data storage device 200, a logical operation is performed on the command sequence information contained in the run-time write block CB to identify the write data later in the command sequence than the lost data.

Figure 5:
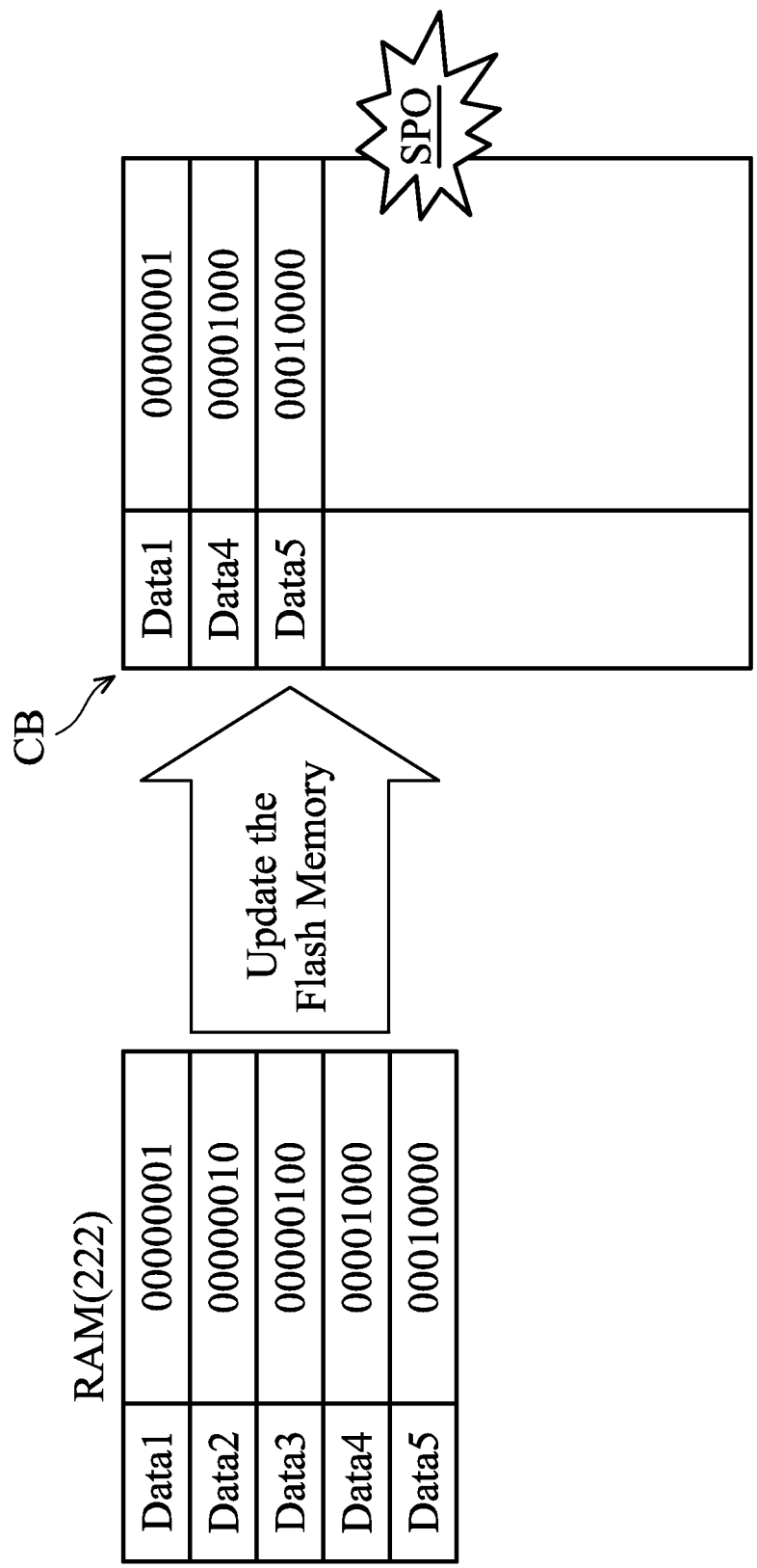
FIG. 5 shows an exemplary embodiment of the disclosure and is discussed with respect to FIG. 2 and, for the write data, 8 bits of each physical page is allocated for storage of command sequence information.

FIG. 5 shows an exemplary embodiment of the disclosure and is discussed with respect to FIG. 2. For the write data, 8 bits of each physical page is allocated for the storage of the command sequence information. The lower bit '1' represents the earlier command. The command sequence information S1 generated for the write data Data1 is represented by "00000001". The command sequence information S2 generated for the write data Data2 is represented by "00000010". The command sequence information S3 generated for the write data Data3 is represented by "00000100". The command sequence information S4 generated for the write data Data4 is represented by "00001000". The command sequence information S5 generated for the write data Data5 is represented by "00010000". As shown, a sudden power-off event SPO occurs during the update of the run-time write block CB. During the power recovery process, the command sequence information "00000001", "00001000" and "00001000" are obtained from the run-time write block CB in step S402. In step S404, a logical OR calculation is performed on the digital bits "00000001", "00001000" and "00001000" and the calculation result is "00011001". The lower bits with logic '0' value show that the write data Data2 and Data3 are lost data. In step S406, the write data Data4 and Data5 later than the lost data Data2 and Data3 in the command sequence is abandoned. The run-time write block CB with the remaining valid data Data1, therefore, is consistent with the command sequence. According to the disclosure, the valid data contained in the run-time write block CB after the power recovery process always complies with the command sequence even though the write data is not uploaded onto the run-time write block CB in the command sequence when considering the operational efficiency.

The invention further involves flash memory control methods, which are not limited to any specific controller architecture. Furthermore, any technique using the aforementioned concept to control a flash memory is within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, providing a storage space that is divided into a plurality of physical blocks with each physical block further divided into a plurality of physical pages; and
a control unit, comprising a microcontroller and a random access memory,
wherein:
the microcontroller is configured to generate command sequence information for write data, and further allocates the random access memory for temporary storage of the write data and the command sequence information;
the microcontroller is further configured to upload the write data onto a run-time write block between the physical blocks of the flash memory with the command sequence information corresponding thereto; and
the microcontroller is further configured to check the run-time write block during a power recovery process of the data storage device and, based on the command sequence information that has been uploaded onto the run-time write block, the write data in the run-time write block and later in a command sequence than lost data is abandoned.

2. The data storage device as claimed in claim 1, wherein:
the microcontroller is configured to abandon the write data later than the lost data in the command sequence before establishing logical-to-physical address mapping information about the run-time write block.

3. The data storage device as claimed in claim 1, wherein:
the microcontroller is configured to further allocate each physical page storing the write data for storage of the command sequence information.

4. The data storage device as claimed in claim 1, wherein:
the microcontroller is configured to store the command sequence information in a plurality of bits; and
the microcontroller is configured to perform a logical operation on the command sequence information obtained from the run-time write block and thereby to determine which write data in the run-time write block is the write data later than the lost data in the command sequence.

5. The data storage device as claimed in claim 4, wherein:
the microcontroller is configured to assert the lower bit between the bits of command sequence information of a sector of write data to logic '1' to represent the earlier that the sector of write data is requested in the command sequence; and
the microcontroller is configured to perform a logical OR calculation on the command sequence information of different sectors of write data obtained from the run-time write block and, the lowest bit of logic '0' in a calculation result of the logical OR calculation corresponds to the lost data.

6. A flash memory control method, comprising:
generating command sequence information for write data that is requested to be written into a flash memory, and allocating a random access memory for temporary storage of the write data and the command sequence information;

uploading the write data onto a run-time write block between physical blocks of the flash memory with the command sequence information corresponding thereto, each physical block comprising a plurality of physical pages; and checking the run-time write block during a power recovery process of a data storage device that is equipped with the flash memory and, in accordance with the command sequence information that has been uploaded onto the run-time write block, the write data in the run-time write block and later in a command sequence than lost data is abandoned.

7. The flash memory control method as claimed in claim 6, further comprising:

abandoning the write data later than the lost data in the command sequence before establishing logical-to-physical address mapping information about the run-time write block.

8. The flash memory control method as claimed in claim 6, comprising:

further allocating each physical page storing the write data for storage of the command sequence information.

9. The flash memory control method as claimed in claim 6, further comprising:

storing the command sequence information in a plurality of bits; and performing a logical operation on the command sequence information obtained from the run-time write block to determine which write data in the run-time write block is the write data later than the lost data in the command sequence.

10. The flash memory control method as claimed in claim 9, further comprising:

asserting the lower bit between the bits of command sequence information of a sector of write data to logic '1' to represent the earlier that the sector of write data is requested in the command sequence; and performing a logical OR calculation on the command sequence information of different sectors of write data obtained from the run-time write block, wherein the lowest bit of logic '0' in a calculation result of the logical OR calculation corresponds to the lost data.

* * * * *